(12) United States Patent
Cao

(10) Patent No.: US 8,547,216 B2
(45) Date of Patent: Oct. 1, 2013

(54) TIRE TEMPERATURE MEASUREMENT SYSTEM

(75) Inventor: Michael Cao, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 407 days.

(21) Appl. No.: 12/957,469

(22) Filed: Dec. 1, 2010

(65) Prior Publication Data
US 2012/0139717 A1    Jun. 7, 2012

(51) Int. Cl.
*B60Q 1/00* (2006.01)

(52) U.S. Cl.
USPC ......... 340/449; 340/438; 340/425.5; 340/463

(58) Field of Classification Search
USPC ................. 340/449, 438, 425.5, 442, 463
See application file for complete search history.

(56) References Cited

U.S. PATENT DOCUMENTS

| | | |
|---|---|---|
| 3,015,803 A | 1/1962 | Neu |
| 4,673,298 A | 6/1987 | Hunter et al. |
| 4,760,371 A | 7/1988 | Don |
| 4,840,496 A | 6/1989 | Elleman et al. |
| 4,867,574 A | 9/1989 | Jenkofsky |
| 4,878,761 A | 11/1989 | Duhrkoop |
| 5,743,645 A * | 4/1998 | Jaynes ................. 374/137 |
| 6,222,454 B1 | 4/2001 | Harling et al. |
| 6,630,885 B2 * | 10/2003 | Hardman et al. ....... 340/505 |
| 6,963,273 B2 | 11/2005 | O'Brien et al. |
| 7,075,421 B1 * | 7/2006 | Tuttle ................. 340/449 |
| 7,161,476 B2 * | 1/2007 | Hardman et al. ....... 340/442 |
| 7,739,529 B2 * | 6/2010 | Hardman et al. ....... 713/320 |
| 8,151,127 B2 * | 4/2012 | Hardman et al. ....... 713/320 |
| 8,220,324 B2 * | 7/2012 | Kokubu et al. ......... 73/146.5 |
| 2002/0075145 A1 * | 6/2002 | Hardman et al. ....... 340/442 |
| 2002/0126005 A1 * | 9/2002 | Hardman et al. ....... 340/442 |
| 2003/0117275 A1 | 6/2003 | Watkins |
| 2004/0017291 A1 * | 1/2004 | Hardman et al. ....... 340/505 |
| 2009/0031795 A1 * | 2/2009 | Kokubu et al. ......... 73/146.5 |
| 2011/0084852 A1 * | 4/2011 | Szczerba ............... 340/905 |

FOREIGN PATENT DOCUMENTS

| | | |
|---|---|---|
| JP | 1032907 | 2/1989 |
| JP | 3262715 | 11/1991 |

* cited by examiner

*Primary Examiner* — Travis Hunnings
(74) *Attorney, Agent, or Firm* — Plumsea Law Group, LLC

(57) ABSTRACT

A system and method for a tire temperature measurement system is disclosed. An instantaneous temperature value of a tire may be requested through an input device. At the time of a temperature measurement request a control unit may retrieve tire temperature from a sensor and determine an instantaneous temperature value of a tire. The instantaneous temperature value of a tire may be displayed, stored and transmitted to a remote device.

20 Claims, 8 Drawing Sheets

TIRE TEMPERATURE MEASUREMENT SYSTEM

BACKGROUND OF THE INVENTION

1. Field of the Invention

The present invention relates to motor vehicles and in particular to a motor vehicle with a non-contact temperature measuring device configured to determine a temperature of a tire.

2. Description of Related Art

Methods of measuring the temperatures of one or more tires of a motor vehicle have been previously proposed. Watkins (U.S. patent number 2003/0117275) is directed to an apparatus for detecting potential tire failure. Watkins teaches a receiver configured to sense thermal characteristics of a tire. Watkins teaches a receiver that is mounted to a portion of the motor vehicle near a wheel. When the thermal characteristics of one or more tires are determined to be above a desired threshold, the driver may be alerted to a potential danger.

Watkins teaches various types of receivers/sensors for detecting the temperature of a tire. Watkins teaches a receiver that may be a thermal sensor, but other temperature monitoring devices, such as an optical imaging device, a CCD device, or an infrared imaging device may be used.

Watkins is primarily concerned with preventing dust or debris from interfering with accurate measurements of the temperature of a tire. In the Watkins design, the receiver is disposed in a housing, including a cover configured to protect the receiver from dust and other debris. The open end of the housing is adapted to be mounted to a portion of a wheel well so that the receiver may communicate with a thermal field of the tire. The housing and cover act to shield the receiver from dust and or debris.

O'Brien (U.S. Pat. No. 6,963,273) is directed to a thermal monitoring system for a tire. The system includes one or more thermal sensors that are carried by a vehicle. O'Brien teaches the use of multiple sensors, each of which may produce signals representative of the temperatures at different locations on the tire. A signal processing device receives the signals and determines if the driver should be alerted of a potential danger associated with the tires.

O'Brien teaches a first thermal sensor and second thermal sensor that are located in a wheel well of the vehicle. The thermal sensors may be used to detect the temperatures of different sections of the tire. Signals from the thermal sensors are transmitted to a processing device. When the processing device determines that an undesirable condition of the tires is present, according to the signals from the thermal sensors, a processing device output signal is communicated to the indicator device.

Generally, the related art systems are only capable of providing a warning when tire temperatures fall outside a predetermined safe operating range. These systems are incapable of ascertaining specific and instantaneous tire temperature information. There is a need in the art for a system and method that addresses the shortcomings of the prior art listed above.

SUMMARY OF THE INVENTION

A system and method for determining an instantaneous temperature value of a tire or a portion of a tire is disclosed. Generally, these methods can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft, and aircraft.

In one aspect, the invention provides a motor vehicle, comprising: a sensor configured to determine a temperature associated with a portion of a tire of the motor vehicle; a control unit in communication with the sensor; a storage device in communication with the control unit; a display device in communication with the control unit configured to display information received from the sensor; an input device in communication with the control unit, wherein the input device is configured to receive a temperature measurement request and configured to send a temperature measurement request to the control unit; and where information related to the temperature of the tire is retrieved from the sensor when the control unit receives the temperature measurement request.

In another aspect, the information related to the temperature of the tire is stored in the storage device.

In another aspect, the information related to the temperature of the tire includes an instantaneous temperature value.

In another aspect, the control unit is configured to send information related to the temperature of the tire to a remote device.

In another aspect, the input device includes an input button.

In another aspect, the display device and the input device are disposed within a console of the motor vehicle.

In another aspect, the invention provides a method of operating a motor vehicle, comprising the steps of: receiving a temperature measurement request; retrieving information from a sensor that is configured to determine a temperature of a tire of the motor vehicle when the temperature measurement request is received; determining an instantaneous temperature value associated with the received information; and storing the instantaneous temperature value.

In another aspect, the step of storing the instantaneous temperature value includes a step of displaying the instantaneous temperature value on a display device.

In another aspect, the temperature measurement request is received from an input device.

In another aspect, the step of storing the instantaneous temperature value includes a step of sending the instantaneous temperature value to a remote device.

In another aspect, the instantaneous temperature value is sent to the remote device using a wireless connection.

In another aspect, the instantaneous temperature value is sent to the remote device using a cable.

In another aspect, the input device includes an input button that is configured to be operated by a driver.

In another aspect, the invention provides a method of transferring information from a motor vehicle to a remote device, comprising the steps of: receiving information from a sensor that is configured to determine a temperature of a tire of the motor vehicle; determining an instantaneous temperature value according to the information received from the sensor and storing the instantaneous temperature value; establishing a connection with the remote device, wherein the remote device is physically spaced away from the motor vehicle; and using the connection to send the instantaneous temperature value to the remote device.

In another aspect, the motor vehicle includes a display device disposed within a console.

In another aspect, the step of determining an instantaneous temperature value and storing the instantaneous temperature value includes a step of displaying the instantaneous temperature value on the display device.

In another aspect, the connection is a wired connection.

In another aspect, the connection is a wireless connection.

In another aspect, the remote device is a remote computer.

In another aspect, the step of receiving information from the sensor includes a step of receiving a temperature measurement request from an input device.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
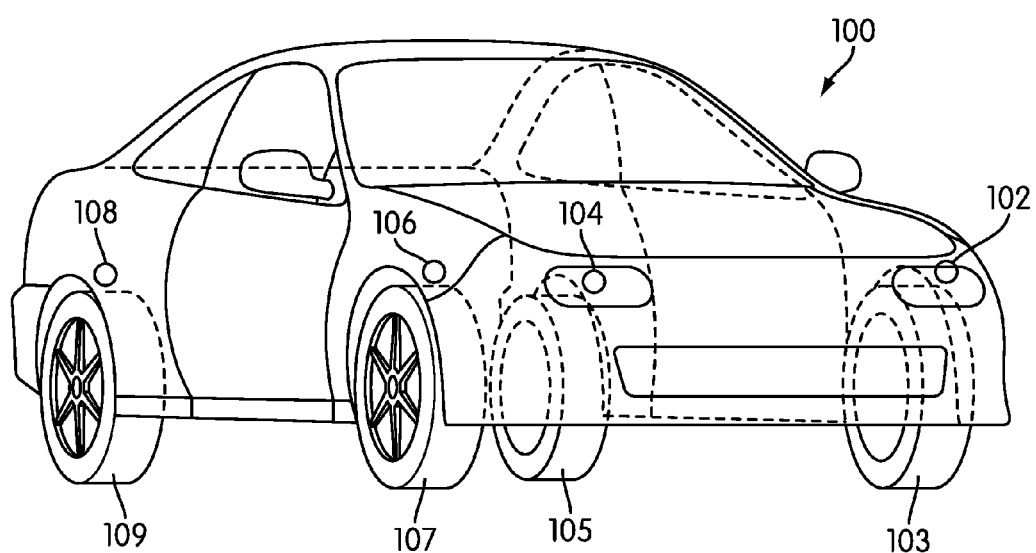
FIG. 1 is a schematic view of a preferred embodiment of a motor vehicle.

FIG. 1 is a schematic view of a preferred embodiment of motor vehicle 100. For purposes of illustration, motor vehicle 100 is shown as a sports car, however it should be understood that in other embodiments motor vehicle 100 could be any type of car, truck or other kind of vehicle. In some embodiments, motor vehicle 100 could be a sedan, a compact car, a hatchback or another type of motor vehicle.

In a preferred embodiment, motor vehicle 100 may be used for motor sports. Examples of motor sports include, but are not limited to, one-make racing, touring car racing, stock car racing, production car racing, rallying, drag racing, sports car racing, and drifting. However, in other embodiments, motor vehicle 100 may be used for non-competitive purposes as well.

When participating in motor sports, the driver, passenger or pit crew may want to monitor the temperature of the tires in order to detect potential tire failure or to choose an optimal time to replace tires. Various methods of determining the temperature of the tires have been used in previous designs. In some cases, a probing type pyrometer may be used to determine tire temperature. In other cases, a non-contact pyrometer may be configured to measure the infrared or optical radiation emitted by the tires to determine tire temperature. Non-contact tire temperature pyrometers are known in the art and examples can be found in U.S. Patent Number 2003/0117275 and U.S. Pat. No. 6,963,273, the entireties of which are incorporated herein by reference.

In some embodiments, motor vehicle 100 may include one or more sensors configured to determine the temperature of one or more tires. In the embodiment shown in the Figures, motor vehicle 100 includes first sensor 102, second sensor 104, third sensor 106 and fourth sensor 108. In this embodiment, first sensor 102, second sensor 104, third sensor 106 and fourth sensor 108 may be associated with front left tire 103, rear left tire 105, front right tire 107 and rear right tire 109, respectively. Using this configuration, the temperatures of tires 103, 105, 107 and 109 may be detected using sensors 102, 104, 106 and 108, respectively.

Although the current embodiment includes four sensors, in other embodiments any number of sensors may be used. In some cases, some tires may be associated with sensors and some tires may not be associated with sensors. For example, in an alternative embodiment only front tires 103 and 107 may be associated with sensors. In another embodiment, only rear tires 105 and 109 may be associated with sensors.

As mentioned previously, any type of sensor may be used to determine the temperature of a tire. In some embodiments, sensors 102, 104, 106 and 108 may be non-contact temperature sensors. In a preferred embodiment, sensors 102, 104, 106 and 108 are non-contact laser pyrometers configured to detect the temperature of a tire.

Figure 2:
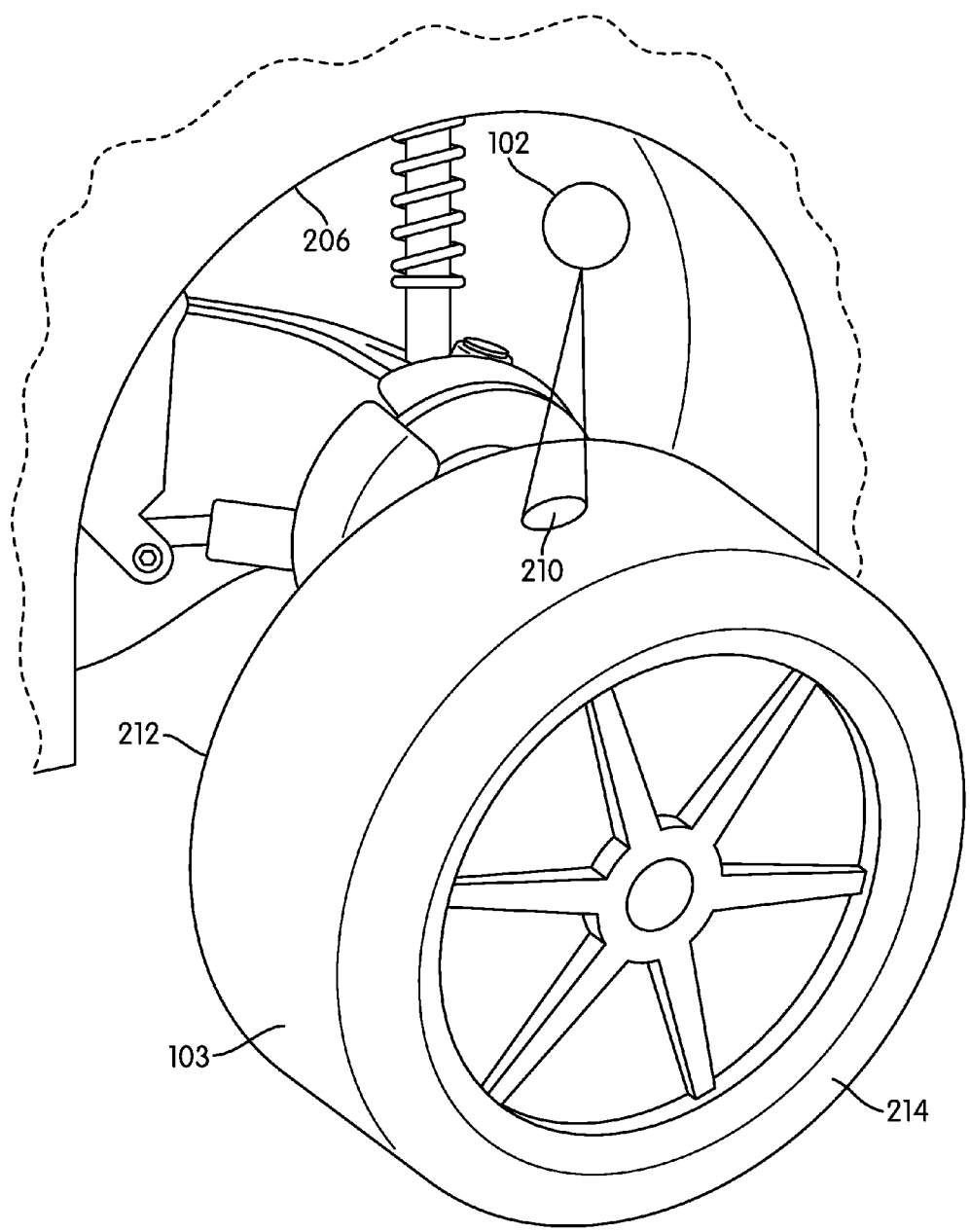
FIG. 2 is an enlarged view of a preferred embodiment of a portion of a motor vehicle.

FIG. 2 is an enlarged view of a preferred embodiment of front left tire 103, first sensor 102 and front left wheel well 206. In this preferred embodiment, first sensor 102 is mounted at the top of front left wheel well 206. The mounting of first sensor 102 may be done using any method known in the art such as welding. In other embodiments, a tire sensor may be mounted in another location such as the shroud or inner fender of a motor vehicle. In some embodiments, additional housing may be constructed for a sensor in order to protect the sensor from dust or debris.

First sensor 102 may be oriented within front left wheel well 206 to receive thermal radiation from first portion 210 of front left tire 103. In the current embodiment, first portion 210 is a central portion of front left tire 103. In other embodiments, first sensor 102 could be configured to receive thermal radiation from inner side wall portion 212 as well as outer side wall portion 214 of front left tire 103. Generally, first sensor 102 may be configured to receive thermal radiation from any portion of front left tire 103.

In the current embodiment, only one sensor is used with each tire. In other embodiments, multiple tire sensors may be used to read temperatures of different portions of a tire. Multiple tire sensors may be mounted within a single wheel well to determine simultaneous temperature readings of multiple portions of a tire including, but not limited to, an inner side wall portion, an outer side wall portion and a central portion of the tire. In some embodiments, a strip of three sensors may be used to determine temperatures for an inner side wall portion, outer side wall portion and the central portion simultaneously. Using multiple temperature measurements for each tire may be useful in determining potential tire failure.

Although FIG. 2 only illustrates the mounting of first sensor 102, sensors 104, 106 and 108 may also be mounted at the top of wheel wells associated with tires 105, 107 and 109. Additionally, although each tire 103, 105, 107 and 109 is associated with a single sensor 102, 104, 106 and 108 in the current embodiment, in other embodiments multiple sensors may be used for some tires in order to determine a more accurate temperature measurement.

Figure 3:
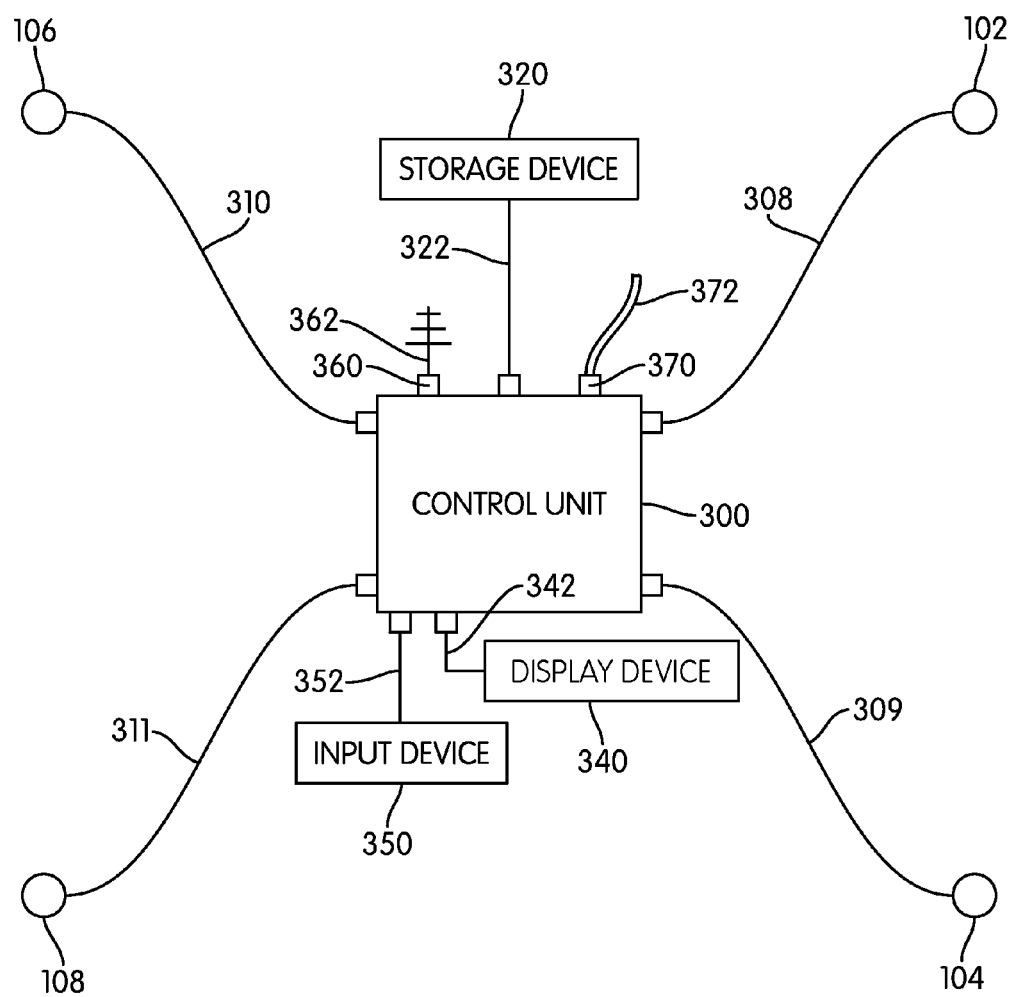
FIG. 3 is a schematic view of a preferred embodiment of a tire temperature measurement system.

FIG. 3 is a schematic diagram of a tire temperature measurement system. In some embodiments, sensors 102, 104, 106 and 108 may be associated with control unit 300. Control unit 300 may a computer of some kind. In some embodiments, control unit 300 may be associated with additional systems of a motor vehicle. In other words, control unit 300 could be part of an onboard computer of the motor vehicle that is configured to control various other systems as well. Generally, control unit 300 may be located anywhere in motor vehicle 100.

In this embodiment, first sensor 102, second sensor 104, third sensor 106, and fourth sensor 108 may be connected to control unit 300 through first connection 308, second connection 309, third connection 310 and fourth connection 311, respectively. Using this arrangement, control unit 300 may receive tire temperatures from sensors 102, 104, 106 and 108.

In some embodiments, control unit 300 may be configured to communicate tire temperatures to a driver or passenger. In some cases, control unit 300 may be configured to communicate with display device 340 through fifth connection 342. Preferably, display device 340 is disposed within a cabin of the motor vehicle and can be viewed by a driver or passenger. Using this arrangement, control unit 300 may send tire temperatures received from sensors 102, 104, 106 and 108 to display device 340. This allows a driver or passenger to monitor current tire temperatures.

In some embodiments, control unit 300 may be capable of communicating in a wired or wireless manner with a remote device, such as a remote computer. The term "remote device", as used here and throughout the remainder of this detailed description refers to any device capable of receiving information from control unit 300 that is physically located away from the motor vehicle. In some cases, control unit 300 may be configured to communicate wirelessly, using antennae port 360. Antennae port 360 may be configured to receive antennae 362. In other cases, control unit 300 may include cable port 370 configured to receive cable 372. In a preferred embodiment, control unit 300 may be capable of both wireless communication with a remote device through antennae port 360 and wired communication with a remote device through cable port 370. This configuration allows control unit 300 to send tire temperatures using wired and/or wireless methods to a remote device.

Preferably, a tire temperature measurement system includes provisions for storing tire temperatures. In this embodiment, control unit 300 may be in communication with storage device 320. In some cases, storage device 320 may be associated with internal memory of control unit 300. In this preferred embodiment, storage device 320 is separate from control unit 300 and connected to control unit 300 via sixth connection 322. Generally, storage device 320 may be located anywhere in motor vehicle 100. This preferred arrangement allows tire temperatures to be stored.

In some embodiments, a control unit may be associated with an input device. In this embodiment, control unit 300 may be connected to input device 350 via seventh connection 352. Using input device 350, control unit 300 may be configured to receive input from a driver or passenger.

Generally, connections 308-311, 322, 342, and 352 may be any type of connection. In some cases, connections 308-311, 322, 342 and 352 may be wired connections such as electrical wires. In other cases, connections 308-311, 322, 342 and 352 may be wireless connections. In still other embodiments, connections 308-311, 322, 342 and 352 may be a mix of both wired and wireless connections.

Figure 4:
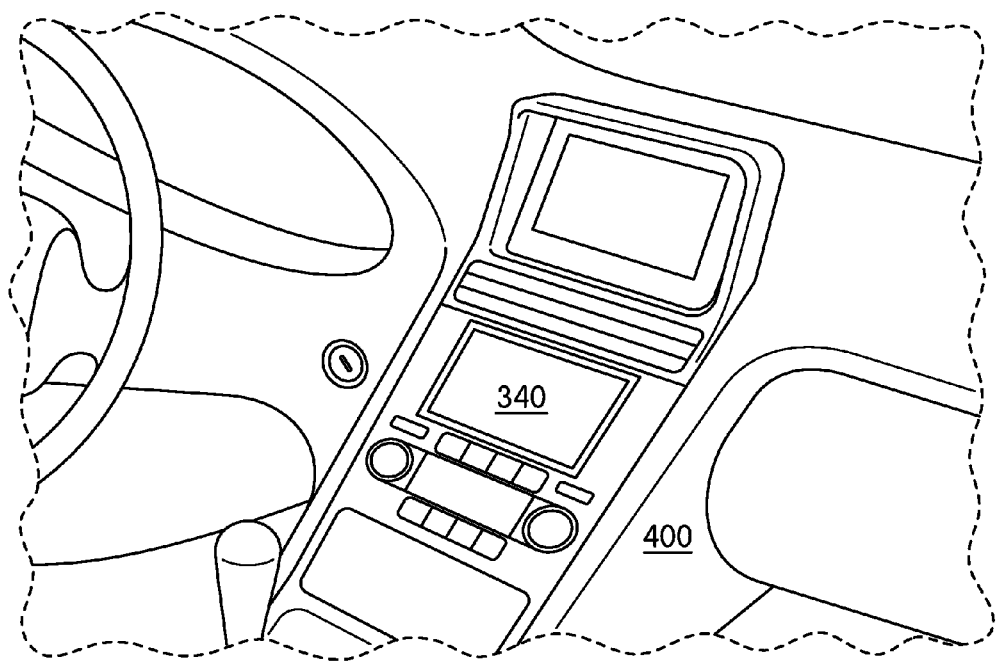
FIG. 4 is a preferred embodiment of a console with a display device.

FIG. 4 illustrates a preferred embodiment of display device 340 disposed within console 400 of motor vehicle 100. Generally, display device 340 may be any type of display sufficient to present tire temperatures to a driver or passenger. In some embodiments, display device 340 may be an analog display such as a CRT display. In other embodiments, display device 340 may be a digital display such as an OLED display or an AMLCD display. In this preferred embodiment, display device 340 is an LCD display.

Although display device 340 is located within console 400 in the current embodiment, in other embodiments, display device 340 could be located at other portions of motor vehicle 100. In other embodiments, for example, display device 340 could be located on the dashboard. Generally, display device 340 may be located anywhere in motor vehicle 100 that is accessible or visible to the driver. Using this arrangement, a driver or passenger may easily read tire temperature values from display device 340.

Figure 5:
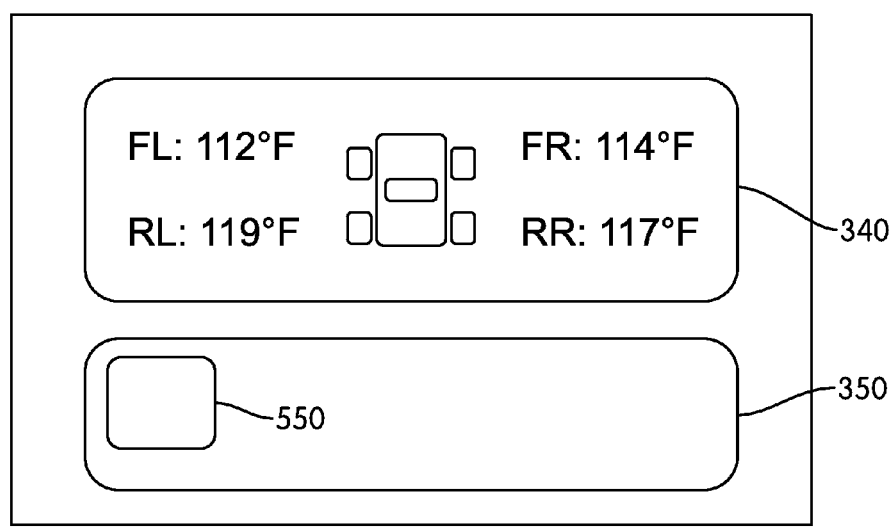
FIG. 5 is an enlarged view of a preferred embodiment of a display device and input device.

FIG. 5 is an enlarged view of a preferred embodiment of display device 340. In this close up view, display device 340 displays tire temperatures in Fahrenheit units with a schematic picture of a motor vehicle, including four tires, and a temperature located proximally to each tire. Also displayed are labels for each tire, including "FL" for front left tire, "RL" for rear left tire, "FR" for front right tire and "RR" for rear right tire. In other cases, tire temperatures may be displayed using various types of graphs or charts. Additionally, tire temperatures may be displayed in Celsius or other units of temperature.

In this preferred embodiment, display device 340 may also be associated with input device 350. In this embodiment, input device 350 includes input button 550. In other embodiments, input device 350 may include additional buttons as well.

Generally, a current reading of tire temperatures as determined by tire sensors is displayed to the driver or passenger. As mentioned previously, tire temperatures may be a factor in the decision to change tires. In motor sports, a current reading of the tire temperature may not be useful for determining when to change tires. For example, it may not be desirable to make a tire change decision based on a current reading of tire temperature when a motor vehicle is slowing or stopped. Instead, knowing the tire temperature at certain operating conditions may be more useful when making tire change decisions or planning pit stops.

Preferably, a tire temperature measurement system may be configured to determine and store an instantaneous temperature value. The term "instantaneous temperature value", as used throughout this detailed description and in the claims, refers to a tire temperature determined by a sensor over a selected period of time. In some cases, the instantaneous temperature value could be associated with a temperature measurement taken at a single instant. In other cases, the instantaneous temperature measurement could be associated with an average temperature measurement taken over several seconds.

In some embodiments, a driver or passenger may make a temperature measurement request for an instantaneous temperature value. In some embodiments, a temperature measurement request may be accomplished using input device 350. In particular, in some embodiments, pressing input button 550 allows a driver or passenger to make a temperature measurement request for an instantaneous temperature value to control unit 300. After receiving a temperature measurement request, control unit 300 communicates with sensors 102, 104, 106 and 108 (see FIG. 1) to determine an instantaneous temperature value for each tire. Preferably, instantaneous temperature values are then displayed on display device 340. Additionally, instantaneous temperature values are preferably stored in storage device 320.

In a preferred embodiment, sensors 102, 104, 106 and 108 may be configured to constantly monitor the current temperature values of tires 103, 105, 107 and 109 (see FIG. 1). In this preferred embodiment, when a driver makes a temperature measurement request, the current temperature values are recorded as instantaneous temperature values to be stored and displayed. In other words, in this preferred embodiment, the control unit is constantly receiving temperature values from sensors 102, 104, 106 and 108, but only stores and displays the temperature values when a temperature measurement request is made. In an alternative embodiment, sensors 102, 104, 106 and 108 may be configured in a standby mode until a temperature measurement request is made. In this alternative embodiment, sensors 102, 104, 106 and 108 are only active and measuring temperature for a selected period of time once a temperature measurement request has been made.

Figure 6:
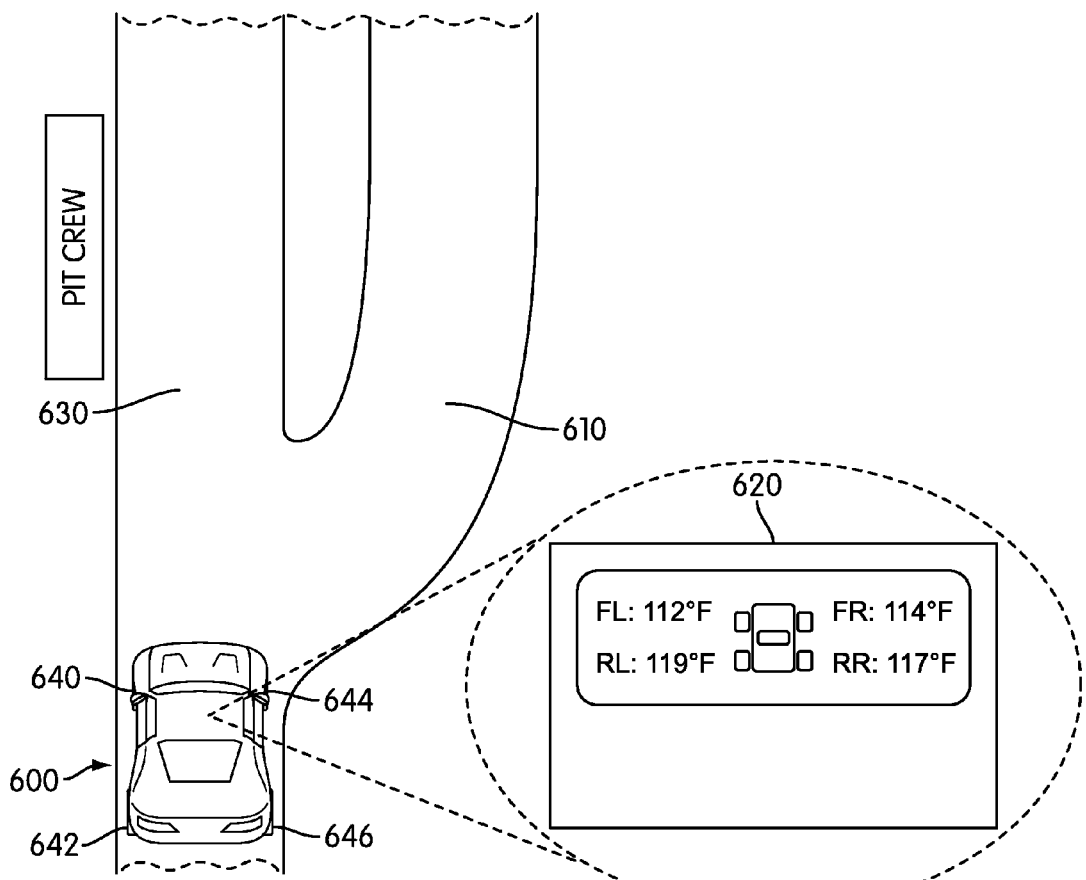
FIG. 6 is a schematic view of an exemplary embodiment of a motor vehicle turning on pit road with current tire temperatures displayed.
Figure 7:
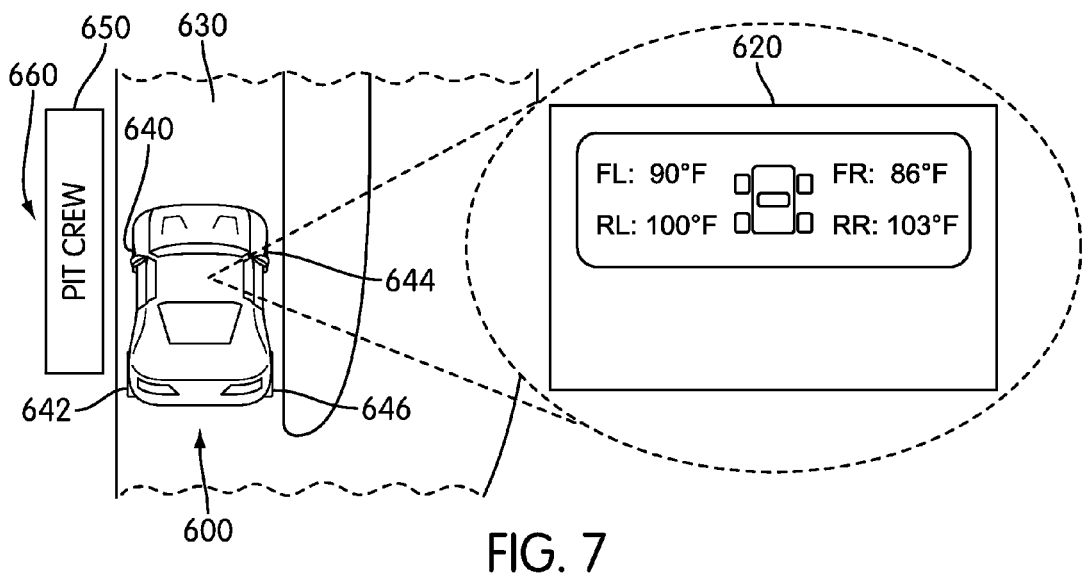
FIG. 7 is a schematic view of an exemplary embodiment of a motor vehicle stopped on pit road in front of a pit crew with current tire temperatures displayed.

Other tire temperature measurement systems have used running temperature measurements, and are not configured to display and store instantaneous temperature values which are associated with a selected time interval. FIGS. 6 and 7 illustrate an exemplary embodiment of motor vehicle 600 including display device 620 configured to display current tire temperatures. This prior design does not include an input device that allows a driver to make a tire temperature measurement request. Instead, this prior design is configured to display the current tire temperature values. In FIG. 6 as motor vehicle 600 prepares to leave track 610 and pull on to pit road 630, display device 620 shows the current tire temperature values. At this point, the current temperatures are 112 degrees Fahrenheit, 119 degrees Fahrenheit, 114 degrees Fahrenheit and 117 degrees Fahrenheit associated with front left tire 640, rear left tire 642, front right tire 644 and rear right tire 646, respectively.

Later, in FIG. 7, motor vehicle 600 arrives at pit stop 660. As motor vehicle 600 slows down, tires 640, 642, 644 and 646 will generally cool down as the heat generated by contact between the tires and the road is reduced at lower speeds. The current tire temperatures shown in display device 620 while motor vehicle 600 is at pit stop 660 are less than the temperatures of the tires before motor vehicle 600 pulled into pit road 630. In particular, the current temperatures, at this later point in time, are 90 degrees Fahrenheit, 100 degrees Fahrenheit, 86 degrees Fahrenheit and 103 degrees Fahrenheit associated with front left tire 640, rear left tire 642, front right tire 644 and rear right tire 646, respectively. Using this type of design, there is no way to store and display the tire temperatures associated with a selected interval of time, such as when the motor vehicle was moving at full speed on the track. In many cases, these current temperature values may not provide sufficient information about the tire temperatures to make decisions about changing tires or preventing potentially hazardous conditions.

The tire temperatures in this embodiment are intended to be exemplary. Generally, tire temperatures may decrease more or less from the time a motor vehicle prepares to make a pit stop and the time a motor vehicle arrives at a pit stop. The tire temperatures will generally be a function of the road conditions, the speed of the vehicle, the type of tires being used as well as other factors.

Figure 8:
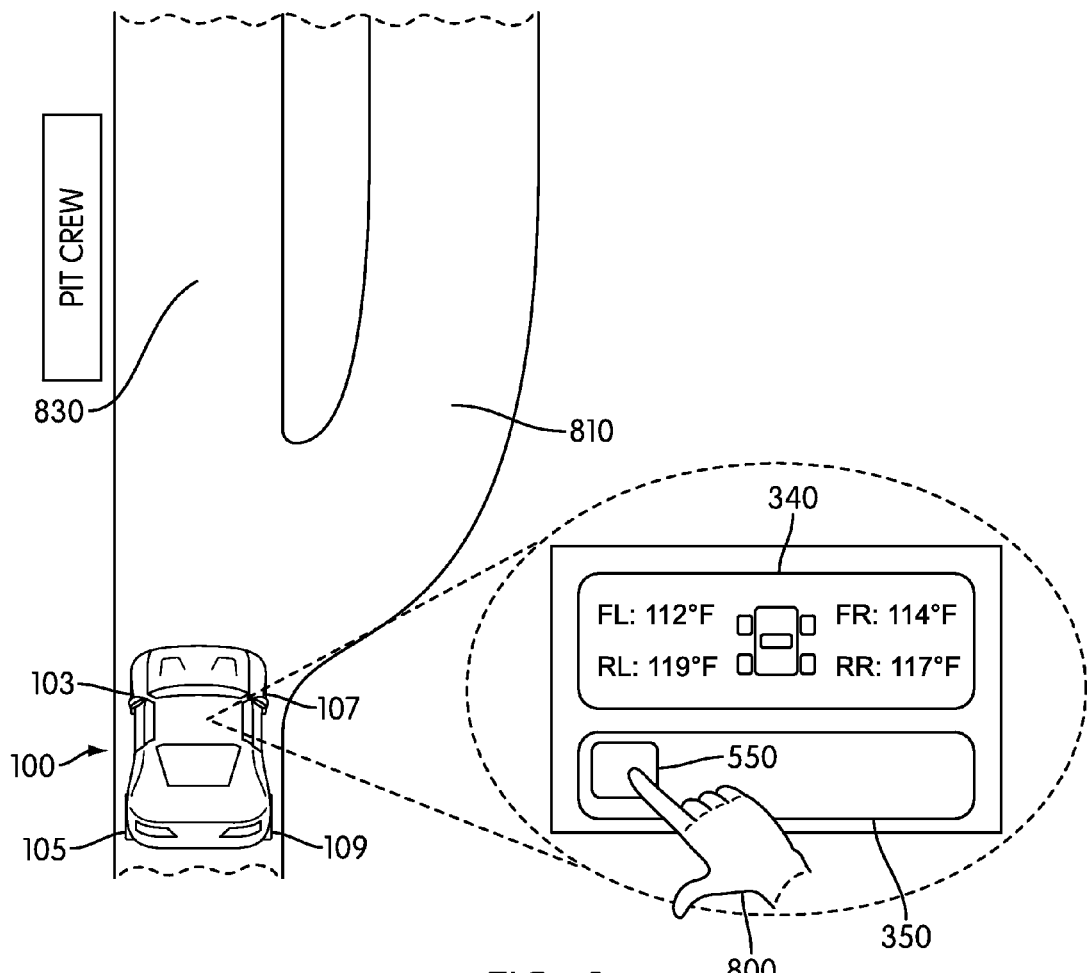
FIG. 8 is a schematic view of a preferred embodiment of a motor vehicle turning on pit road with instantaneous temperature values recorded.
Figure 9:
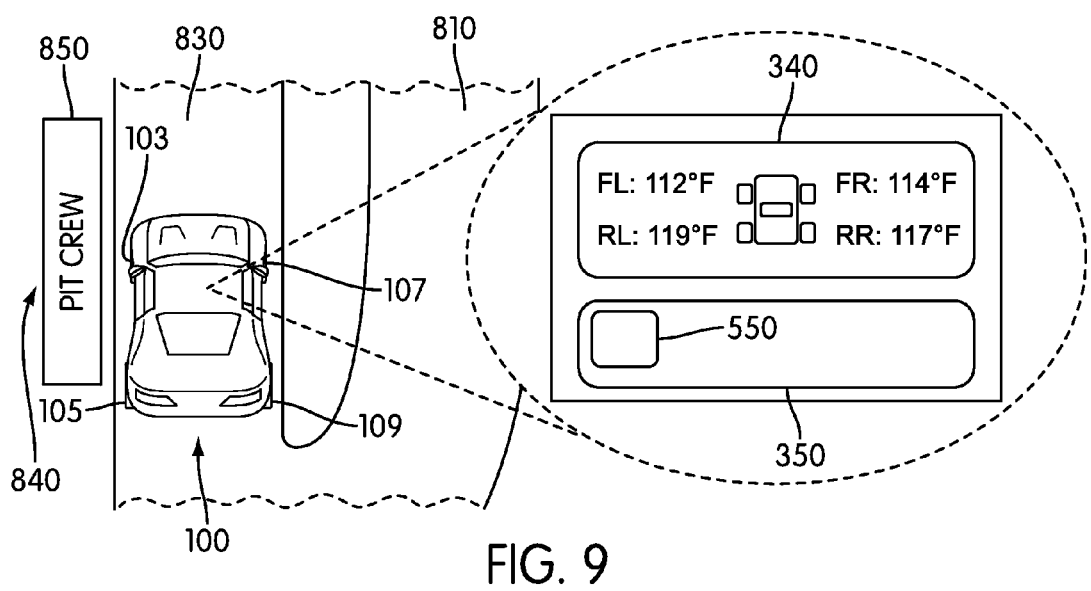
FIG. 9 is a schematic view of a preferred embodiment of a motor vehicle stopped on pit road in front of a pit crew with instantaneous temperature values displayed.

FIGS. 8 and 9 illustrate a preferred embodiment of motor vehicle 100 as it prepares to leave track 810 and pull on to pit road 830. In this embodiment, motor vehicle 100 is configured with a tire temperature measurement system including non-contact tire temperature sensors, as discussed in this detailed description. Recall from FIG. 3, that the tire temperature measurement system preferably includes input device 350 that allows a driver to make a temperature measurement request. Also, the tire temperature measurement system preferably includes a display device 340 for viewing instantaneous temperature values and storage device 320 for storing the instantaneous temperature values.

Returning to the embodiment shown in FIGS. 8 and 9, prior to leaving track 810, driver 800 pushes input button 550 of input device 350 to make a temperature measurement request. This request is preferably received by control unit 300. Then, control unit 300 retrieves tire temperatures from sensors 102, 104, 106 and 108 (see FIG. 1) and displays instantaneous temperature values on display device 340. Additionally, in some embodiments, the instantaneous temperature values may be stored in storage device 320. As shown on display device 340 in the current embodiment, the instantaneous temperature values are 112 degrees Fahrenheit, 119 degrees Fahrenheit, 114 degrees Fahrenheit and 117 degrees Fahrenheit associated with front left tire 103, rear left tire 105, front right tire 107 and rear right tire 109, respectively.

FIG. 9 illustrates a preferred embodiment of motor vehicle 100 arriving at pit stop 840. Display device 340 continues to display the instantaneous temperature values determined at the time of the temperature measurement request. The instantaneous temperature values provide temperature information about the operating tire temperatures of motor vehicle 100 just before exiting track 810. With this preferred arrangement, pit crew 850 and driver 800 are able to make a more informed tire change decision using the instantaneous temperature values displayed on display device 340 than would be possible if only the current temperature values were known.

In some embodiments, the instantaneous temperature values may be communicated to the pit crew as the motor vehicle arrives at the pit stop. This allows the pit crew to determine which tires should be changed. In some cases, the instantaneous temperature values may be transmitted to a remote device, such as a remote computer that is located at the pit stop. In other cases, the driver may tell the pit crew what the instantaneous temperature values are by reading the values off of the display.

Figure 10:
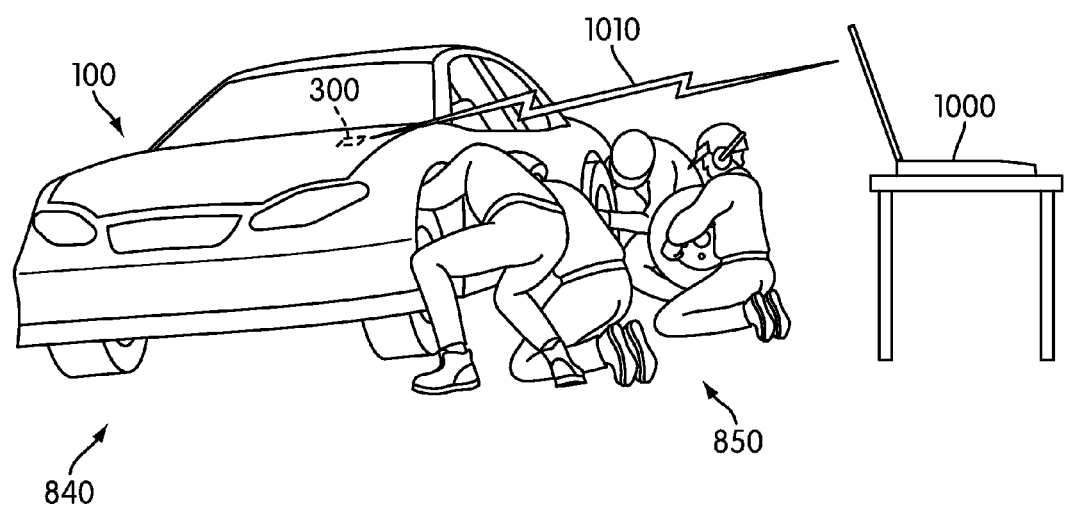
FIG. 10 is a preferred embodiment of a motor vehicle with a wireless connection established to a pit crew's computer.

FIG. 10 is a preferred embodiment of pit crew 850 working on motor vehicle 100 at pit stop 840. In this embodiment, pit stop 840 may include remote device 1000 that is configured to communicate with control unit 300. In a preferred embodiment, remote device 1000 is a remote computer.

In this embodiment, control unit 300 communicates to remote device 1000 with wireless connection 1010. In some cases, temperature information comprising a single set or multiple sets of instantaneous temperature values may be downloaded to remote device 1000. The instantaneous temperature values downloaded from control unit 300 may be useful to pit crew 850 for deciding which tires may need to be changed.

Figure 11:
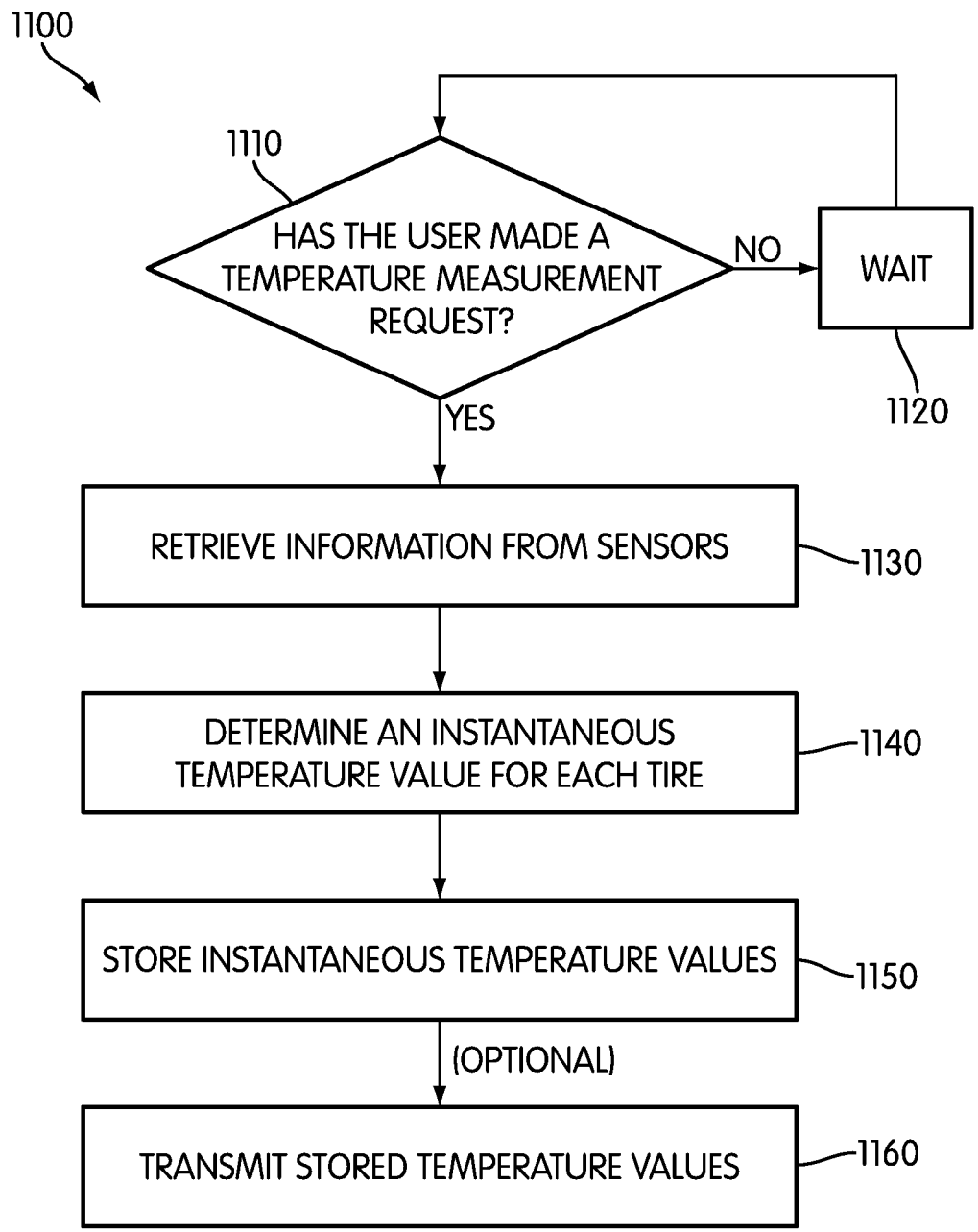
FIG. 11 is a preferred embodiment of a process for requesting, storing and optionally transmitting instantaneous temperature values.

FIG. 11 is a preferred embodiment of process 1100 for controlling a tire temperature measurement system. In this embodiment, the following steps are preferably performed by control unit 300, however in some embodiments these steps may be performed by additional systems or devices associated with motor vehicle 100.

During step 1110, control unit 300 determines if a user has made a temperature measurement request using input device 350. If no temperature measurement request has been made, control unit 300 preferably proceeds to step 1120. During step 1120, control unit 300 preferably waits for a temperature measurement request. Following step 1120, control unit 300 preferably returns to step 1110 that was previously discussed.

If a temperature measurement request has been made, control unit 300 preferably proceeds to step 1130. During step 1130, control unit 300 receives information from sensors 102, 104, 106 and 108 (see FIG. 1). After receiving information from sensors 102, 104, 106 and 108, control unit 300 preferably proceeds to step 1140. During step 1140, control unit 300 determines instantaneous temperature values for the tires. After step 1140, control unit 300 preferably proceeds to step 1150 and stores the instantaneous temperature values in storage device 320.

Optionally, after step 1150, control unit 300 may proceed to step 1160. During step 1160, control unit 300 may establish a wired or wireless connection with a remote device and transmit stored instantaneous temperature values to the remote device. The instantaneous temperature values may be used for determining if one or more tires should be changed. Additionally, in some cases, multiple instantaneous temperature values that have been stored and transmitted to a remove device can be used for analyzing temperature information over time, examination for peak or low tire temperatures, identifying particular portions of the route or track and the corresponding tire temperatures, and planning pit stops.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A motor vehicle, comprising:
a sensor mounted on the motor vehicle, the sensor being configured to determine a temperature associated with a portion of a tire of the motor vehicle, the sensor being physically spaced apart from and disposed above the tire;
a control unit disposed in the motor vehicle, the control unit being in communication with the sensor;
a storage device in communication with the control unit;
a display device disposed within an interior of the motor vehicle, the display device being in communication with the control unit and being configured to display information received from the sensor;
an input device disposed within the interior of the motor vehicle, the input device being in communication with the control unit, wherein the input device is configured to receive a temperature measurement request at a selected interval of time, and wherein the control unit is configured to send a temperature measurement request to the control unit;
wherein information related to the temperature of the tire is retrieved from the sensor when the control unit receives the temperature measurement request; and
wherein the sensor is configured to determine an instantaneous temperature value of the portion of the tire of the motor vehicle that is associated with the selected interval of time.

2. The motor vehicle according to claim 1, wherein the information related to the temperature of the tire is stored in the storage device.

3. The motor vehicle according to claim 1, wherein the instantaneous temperature value is configured to be retrieved from the sensor while the motor vehicle is moving.

4. The motor vehicle according to claim 1, wherein the control unit is configured to send information related to the temperature of the tire to a remote device; and
wherein the remote device is located outside of the motor vehicle.

5. The motor vehicle according to claim 1, wherein the input device includes an input button.

6. The motor vehicle according to claim 2, wherein the display device and the input device are disposed within a console of the motor vehicle.

7. A method of operating a motor vehicle, comprising the steps of:
receiving a temperature measurement request from an input device disposed within an interior of the motor vehicle associated with a selected interval of time;
retrieving information from a sensor mounted on the motor vehicle that is configured to determine a temperature of a tire of the motor vehicle when the temperature measurement request is received, the sensor being physically spaced apart from and disposed above the tire;
determining an instantaneous temperature value associated with the received information for the selected interval of time; and
storing the instantaneous temperature value in a storage device disposed in the motor vehicle.

8. The method according to claim 7, wherein the step of storing the instantaneous temperature value includes a step of displaying the instantaneous temperature value on a display device disposed within the interior of the motor vehicle.

9. The method according to claim 7, wherein the temperature measurement request is received from the input device while the motor vehicle is moving.

10. The method according to claim 7, wherein the step of storing the instantaneous temperature value includes a step of sending the instantaneous temperature value to a remote device located outside of the motor vehicle.

11. The method according to claim 10, wherein the instantaneous temperature value is sent to the remote device using a wireless connection.

12. The method according to claim 10, wherein the instantaneous temperature value is sent to the remote device using a cable.

13. The method according to claim 7, wherein the input device includes an input button that is configured to be operated by a driver from within the interior of the motor vehicle.

14. A method of transferring information from a motor vehicle to a remote device located outside of the motor vehicle, comprising the steps of:
receiving information from a sensor mounted on the motor vehicle that is configured to determine a temperature of a tire of the motor vehicle, the sensor being physically spaced apart from and disposed above the tire;

determining an instantaneous temperature value according to the information received from the sensor at a selected interval of time while the motor vehicle is moving;

storing the instantaneous temperature value for the selected interval of time while the motor vehicle is moving;

establishing a connection with the remote device, wherein the remote device is physically spaced away from the motor vehicle; and using the connection to send the instantaneous temperature value for the selected interval of time to the remote device.

15. The method according to claim 14, wherein the motor vehicle includes a display device disposed within a console.

16. The method according to claim 14, wherein the step of determining an instantaneous temperature value and storing the instantaneous temperature value includes a step of displaying the instantaneous temperature value on the display device.

17. The method according to claim 14, wherein the connection is a wired connection.

18. The method according to claim 14, wherein the connection is a wireless connection.

19. The method according to claim 14, wherein the remote device is a remote computer.

20. The method according to claim 14, wherein the step of receiving information from the sensor includes a step of receiving a temperature measurement request from an input device.

* * * * *